United States Patent
Oh et al.

[19]

[11] Patent Number: 6,078,790
[45] Date of Patent: Jun. 20, 2000

[54] RADIO FREQUENCY GENERATOR FOR A RADIO COMMUNICATION SYSTEM

[75] Inventors: Chang-Heon Oh; Sung-Gyu Kim, both of Seoul, Rep. of Korea

[73] Assignee: SamSung Electronics Co., Ltd., Kyungki-do, Rep. of Korea

[21] Appl. No.: 08/840,707

[22] Filed: Apr. 25, 1997

[30] Foreign Application Priority Data

Apr. 25, 1996 [KR] Rep. of Korea ................. 96-12915

[51] Int. Cl.[7] ........................................ H04B 1/40
[52] U.S. Cl. .......................... 455/75; 455/118; 455/314; 331/25
[58] Field of Search ............................... 455/75, 76, 84, 455/85, 86, 112, 118, 313, 314, 260, 264; 331/25

[56] References Cited

U.S. PATENT DOCUMENTS

| | | | |
|---|---|---|---|
| 2,974,222 | 3/1961 | Lawson | 455/75 |
| 5,423,076 | 6/1995 | Westergren et al. | 455/86 |
| 5,432,779 | 7/1995 | Shimo et al. | 370/30 |
| 5,465,409 | 11/1995 | Borras et al. | 455/260 |
| 5,483,679 | 1/1996 | Sasaki | 455/86 |
| 5,603,097 | 2/1997 | Kanou | 455/76 |
| 5,668,829 | 9/1997 | Saito | 375/208 |
| 5,669,067 | 9/1997 | Mambo | 455/76 |

FOREIGN PATENT DOCUMENTS 2120906  5/1983  United Kingdom.

Primary Examiner—Reinhard J. Eisenzopf
Assistant Examiner—Darnell R. Armstrong
Attorney, Agent, or Firm—Robert E. Bushnell, Esq.

[57] ABSTRACT

A radio frequency generator in a radio communication system having a transmitter for up-converting the frequency of transmission data signals, and a receiver for down-converting the frequency of reception data signals includes: a first radio frequency generator for generating a low-band reception local oscillator frequency signal which is provided to a second mixer in the receiver; a second radio frequency generator for generating a low-band transmission local oscillator frequency signal which is provided to a first mixer in the transmitter; and a third radio frequency generator for generating a high-band local oscillator frequency signal for a first mixer of the receiver and a second mixer of the transmitter. A reference frequency generator is provided for receiving a radio frequency signal from a global position system receiver and generating a reference signal for generating local oscillator frequency signals in response thereto.

5 Claims, 4 Drawing Sheets

RADIO FREQUENCY GENERATOR FOR A RADIO COMMUNICATION SYSTEM

CLAIM OF PRIORITY

This application makes reference to, incorporates the same herein, and claims all benefits accruing under 35 U.S.C. §119 from an application for FREQUENCY GENERATOR OF RADIO COMMUNICATION SYSTEM earlier filed in the Korean Industrial Property Office on Apr. 25, 1996 and there duly assigned Serial No. 12915/1996, a copy of which application is annexed hereto.

BACKGROUND OF THE INVENTION

1. Field of the Invention

The present invention relates to a radio frequency generator for a radio communications system, specifically, to a technique for generating the radio frequency signals required for transmission and reception of data in a digital cellular base station.

2. Description of the Related Art

Generally, a transceiver, using the superheterodyne method, needs a frequency generator which up-converts the frequency of transmitted data signals or down-converts the frequency of received data signals. This frequency generator should generates a stable signal suitable for a predetermined prescribed performance in a radio communication system. Since the frequency of a transceiver used in a digital cellular base station must operate within a transmission band of 869 to 894 MHz and reception band of 824 to 849 MHz, the frequency generator should generate a local oscillator signal which can provide signals within the above specified transmission and reception bands.

The radio frequency generator used in a digital cellular base station provides the transceiver with intermediate frequency local oscillator (IF LO) signals and ultra-high frequency local oscillator (UHF LO) signals using a frequency synthesizer in a phase lock loop (PLL) mode. A method proposed by Qualcomm Co. of the United States is an example of a radio frequency generator using the PLL frequency synthesizing method. The frequency generator of Qualcomm Co. consists of a 65.04 MHz frequency synthesizer, a RX frequency synthesizer [UHF(754 to 779 MHz)], and a TX frequency synthesizer [UHF(799 to 824 MHz)]. This radio frequency generator uses the IF LO signal in the transmission and reception portions of the radio communication system, and uses the UHF LO signal in transmission, and UHF LO signal in reception. With a conventional frequency generator, two UHF LO signals having a frequency difference of 45 MHZ are used on the same board, and a spurious effect between the two UHF LO signals is generated.

The Schneider patent, U.S. Pat. No. 3,324,396, entitled Multiple Conversion Transceiver Utilizing Single Oscillator, discloses a basis concept of utilizing a single radio frequency generator for generating local oscillator frequencies for one or more mixer stages in both transmitting and receiving portions of a transceiver.

Similarly, both the O'Connor and Ertman patents, U.S. Pat. Nos. 3,825,830 and 3,509,462 entitled respectively Offset Oscillator System for Radio Transmitter And Receiver, and Spurious-Free Phase-Locked Continuously Tuned Transceiver System, disclose single local oscillators being utilized for both receiver and transmitter portions of transceiver systems.

The Shimakata patent, U.S. Pat. No. 4,627,099, entitled Communication Apparatus For Transmitting And Receiving Signals On Different Frequency Bands, discloses an arrangement in which a reference oscillator output is connected to a plurality of frequency dividers whose output is connected to respective phase lock loop networks to produce different output frequencies.

The Franke et al. patent, U.S. Pat. No. 4,476,575, entitled Radio Transceiver, discloses a radio transceiver in which a single oscillator output is utilized for generating local oscillator signals for the mixer portions of both transmitting and receiving portions of the transceiver.

The Vaisanen patent, U.S. Pat. No. 5,519,885, entitled Method to Generate Different Frequency Signals In A Digital Radio Telephone, discloses an arrangement for a cellular telephone in which different radio frequency signals are generated for use both in transmission and reception portions of a digital radio telephone.

The following references each disclose features in common with the present invention but do not teach or suggest the specifically recited technique for generating radio frequency signals required for transmission and reception of data in a digital cellular base station.

U.S. Pat. No. 5,319,799 to Morita, entitled Single Oscillation Method For Time-Division Duplex Radio Transceiver And Apparatus Using The Same, U.S. Pat. No. 4,528,522 to Matsuura, entitled FM Transceiver Frequency Synthesizer, U.S. Pat. No. 5,574,986 to Mobach, entitled Telecommunication System, And A First Station, A Second Station, And A Transceiver For Use In Such A System, U.S. Pat. No. 5,610,559 to Dent, entitled Dual Loop Frequency Synthesizer having Fractional Dividers, U.S. Pat. No. 5,355,523 to Ogawa et al., entitled Wireless Transmission/Reception System Including Transmitting Terminal Producing Multiple Frequency Local Oscillation Signals And Receiving Terminal Storing A Local Oscillation Signal, U. S. Pat. No. 5,493,710 to Takahara et al., entitled Communication System Having Oscillation Frequency Calibrating Function, and U.S. Pat. No. 5,493,700 to Hietala et al., entitled Automatic Frequency Control Apparatus.

SUMMARY OF THE INVENTION

An objective of the present invention is to provide a technique for generating a radio frequency signal which up-converts or down-converts data signals in the transmission and reception processes of a radio communication system.

Another objective of the present invention is to provide a technique for generating a radio frequency signal in which a UHF signal is used as a local oscillator signal in the transmission and reception circuits, and intermediate frequency signals having different frequencies are used separately in transmission and reception.

To accomplish the objectives of the present invention, there is provided a radio frequency generator included in a radio communication system having a transmitter for up-converting the frequency of transmission data signals, and a receiver down-converting the frequency of reception data signals, the radio frequency generator including: a first radio frequency generator for generating a low-band reception local frequency signal which is provided to a second mixer in the receiver; a second radio frequency generator for generating a low-band transmission local frequency signal which is provided to a first mixer in the transmitter; and a third radio frequency generator for generating a high-band local frequency signal which is provided to a first mixer in the receiver and a second mixer in the transmitter. A reference frequency generator is provided for receiving a radio frequency signal from a global position system receiver and generating a reference signal for generating local oscillator frequency signals in response thereto.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

Reference will now be made in detail to the preferred embodiment of the present invention, examples of which are illustrated in the accompanying drawings. For clarity, component reference numbers are consistent between all the drawings.

A "first frequency" used in the following description is a 65.04 MHz signal f3 generated by a first radio frequency generator 12. The first frequency signal f3 is used as a local oscillator frequency RX-IF-LO for reception of incoming messages. A "second frequency" is a 110.04 MHz signal f4, generated by a second radio frequency generator 13. The second frequency f4 is used as a local oscillator frequency TX-IF-LO for the transmission of outgoing messages. A "third frequency" f5 which is 754 to 779 MHz in the UHF band, is generated by a third radio frequency generator 14. The third frequency f5 is used as a local oscillator frequency UHF-IF-LO for both transmission and reception.

Figure 1:
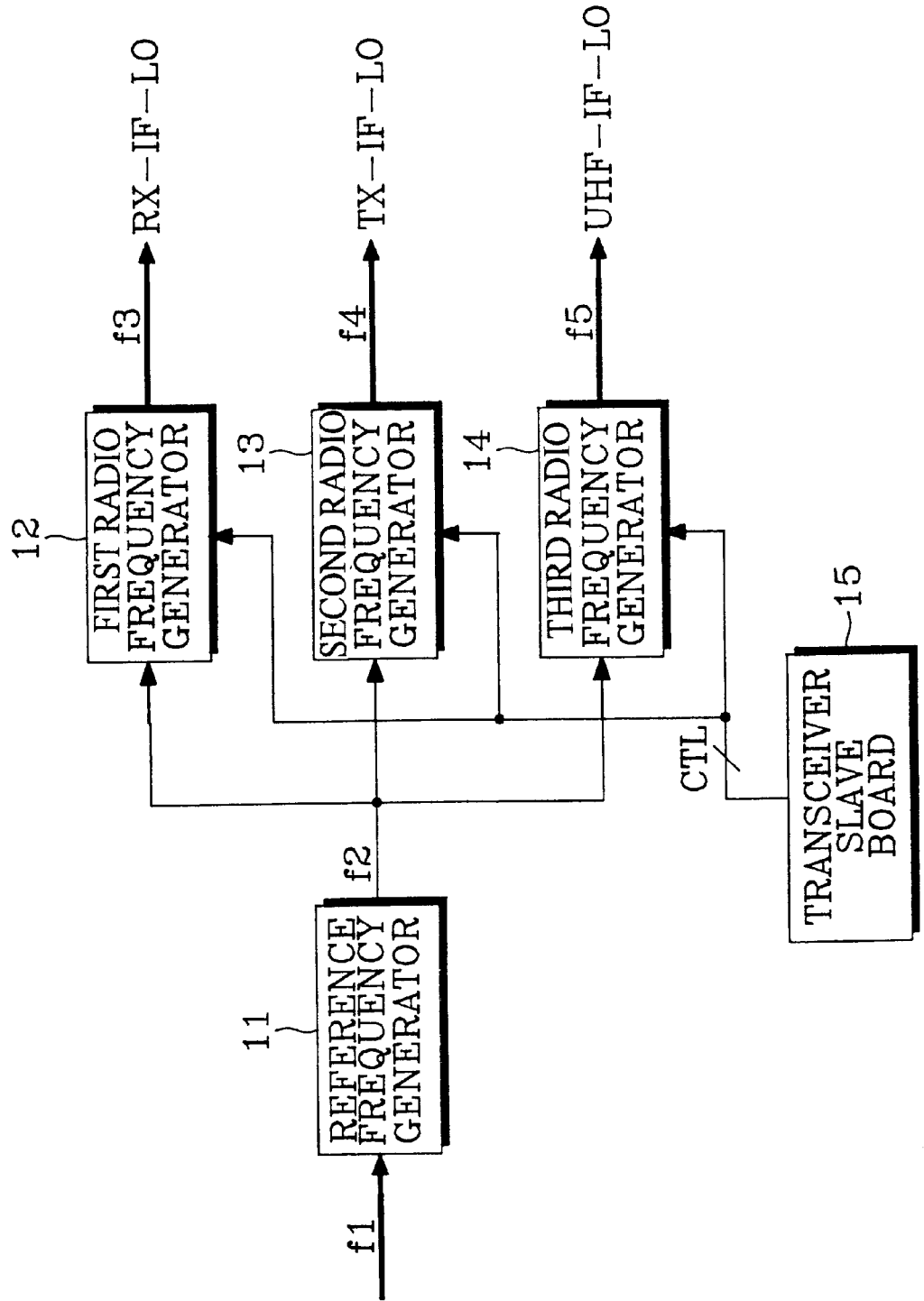
FIG. 1 is a block diagram of a radio frequency generator in a digital cellular base station according to an embodiment of the present invention.

FIG. 1 is a block diagram of a radio frequency generator used in a digital base station according to the present invention. Referring to FIG. 1, a reference frequency generator 11 receives and frequency-converts a 10 MHz signal f1 from a global position system (GPS) receiver, and generates a reference frequency f2 for the purpose of generating signals used in the transmission and reception operations of the digital cellular base station. It is necessary for reference frequency f2 is used in both the transmission and reception. In an embodiment of the present invention, reference frequency f2 to be 7.2 MHz. In this case, reference frequency generator 11 may consist of a PLL which generates a 7.2 MHz reference frequency f2 by converting a 10 MHz signal f1.

The first radio frequency generator 12 receives and up-converts reference frequency f2, to generate the 65.04 MHz first frequency f3. The first frequency f3 is supplied as a local oscillator signal to a second mixer in the reception portion of the system. The first radio frequency generator 12 may consist of a PLL which up-converts the 7.2 MHz reference signal f2, to generate a 65.04 MHz signal.

The second frequency generator 13, receives reference signal f2, and from reference frequency f2, generates a 110.04 MHz second frequency signal f4. The second frequency f4 is supplied as a local oscillator signal to a first mixer in the transmission portion of the system. The second radio frequency generator 13 may consist of a PLL which up-converts the 7.2 MHz reference signal f2, to generate a 110.04 MHz frequency signal.

The third radio frequency generator 14 receives reference signal f2, and generates a 754 to 779 MHz third frequency signal f5. The third frequency signal f5 is supplied to both the first mixer in the reception portion of the system and the second mixer in the transmission portions of the system as a UHF local oscillator signal. The third radio frequency generator 14 may consist of a PLL which up-converts the 7.2 MHz reference signal f2, to thereby generate a 754 to 779 MHZ signal.

A transceiver slave board 15, controls the overall operation, the transmission and reception of data, within the digital cellular station. In the present invention, the aforementioned radio frequency generators 11 to 14 provide signals which have a relationship with respect to their frequency generating operations.

The reference frequency generator 11 receives a 10 MHZ signal f1 generated by a GPS receiver under the control of transceiver slave board 15, and generates a 7.2 MHz reference signal for the radio frequency signal generators 12, 13 and 14. The first radio frequency generator 12 generates the 65.04 MHZ signal f3 which is in-phase with signal f2. The signal f3 is supplied to the mixer in the reception circuit as a reception local oscillator frequency RX-IF-LO. The second radio frequency generator 13, receives signal f2 from reference frequency generator 11 under the control of transceiver slave board 15, and generates a 110.04 MHZ signal f4 which is in-phase with signal f2 and up-converted. The signal f4 is supplied to the mixer in the transmission circuit as a transmission local oscillator frequency TX-IF-LO.

Figure 2:
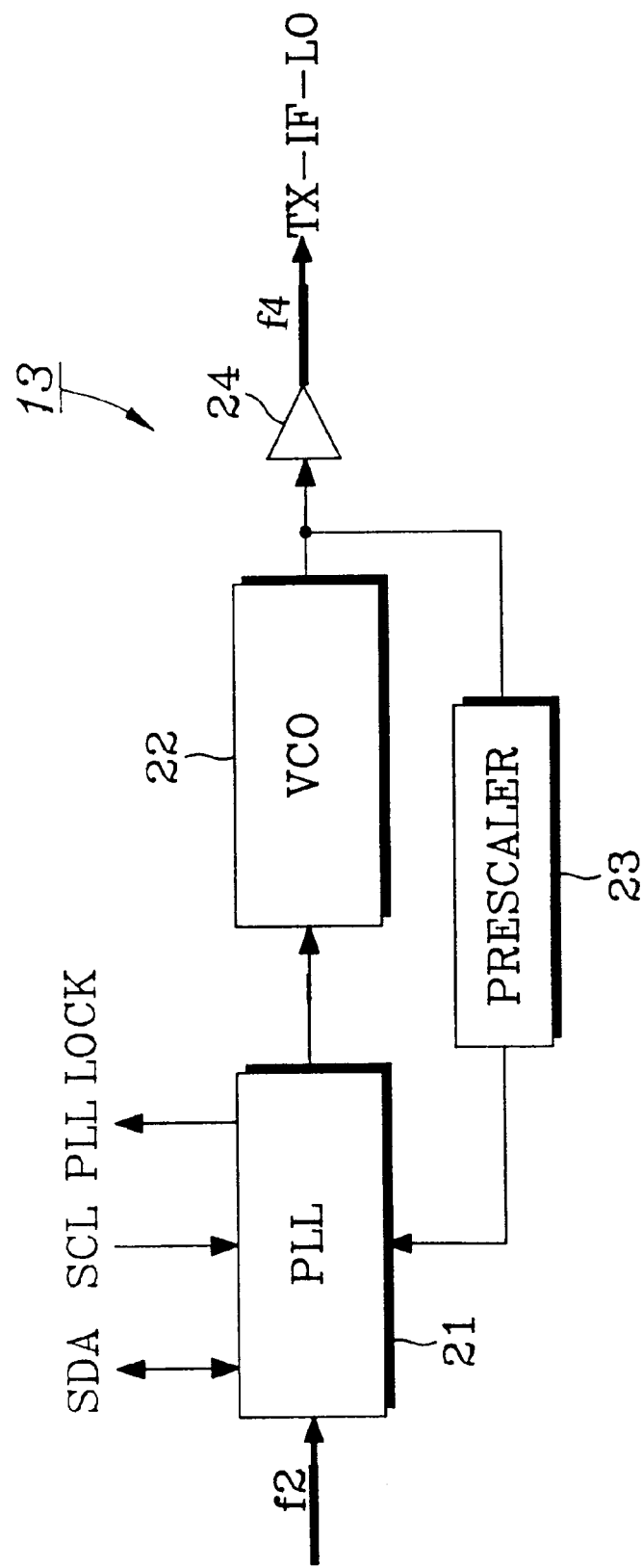
FIG. 2 is a block diagram of a second radio frequency generator in FIG. 1.

FIG. 2 is a block diagram of the second radio frequency generator 13 in FIG. 1. Referring to FIG. 2, a PLL 21, receives control data SDA and a clock SCL output from the transceiver slave board 15, the signal f2 and an output from a prescaler 23. The PLL 21 is in free-running operation mode in the initial state, and it generates phase loop lock data PLL-LOCK for transceiver slave board 15 when its operation becomes stable. When the PLL 21 reaches a normal operational state, it generates an oscillation control signal according to the phase difference between the signal f2 and the frequency output from prescaler 23. As the aforementioned PLL, commercially available Part Number TBB200G from Siemens Ag. may be used.

A voltage controlled oscillator (VCO) 22 oscillates according to the oscillation control signal from PLL 21, and generates 110.04 MHz signal f4. The prescaler 23 prescales signal f4 from VCO 22, and feeds it to PLL 21. As the prescaler, commercially available Part Number MC2022AD from the Motorola Co. can be employed.

An amplifier 24 amplifies the signal f4 from VCO 22, and outputs it as a transmission local oscillator signal TX-IF-LO.

The third radio frequency generator 14 receives signal f2 from reference frequency generator 11, and generates signal f5 which is in-phase with signal f2 and up-converted. The signal f5 is supplied to the mixers of both the transmission and reception circuits as a 754 to 779 MHz UHF local oscillator frequency signal UHF-IF-LO.

Figure 3:
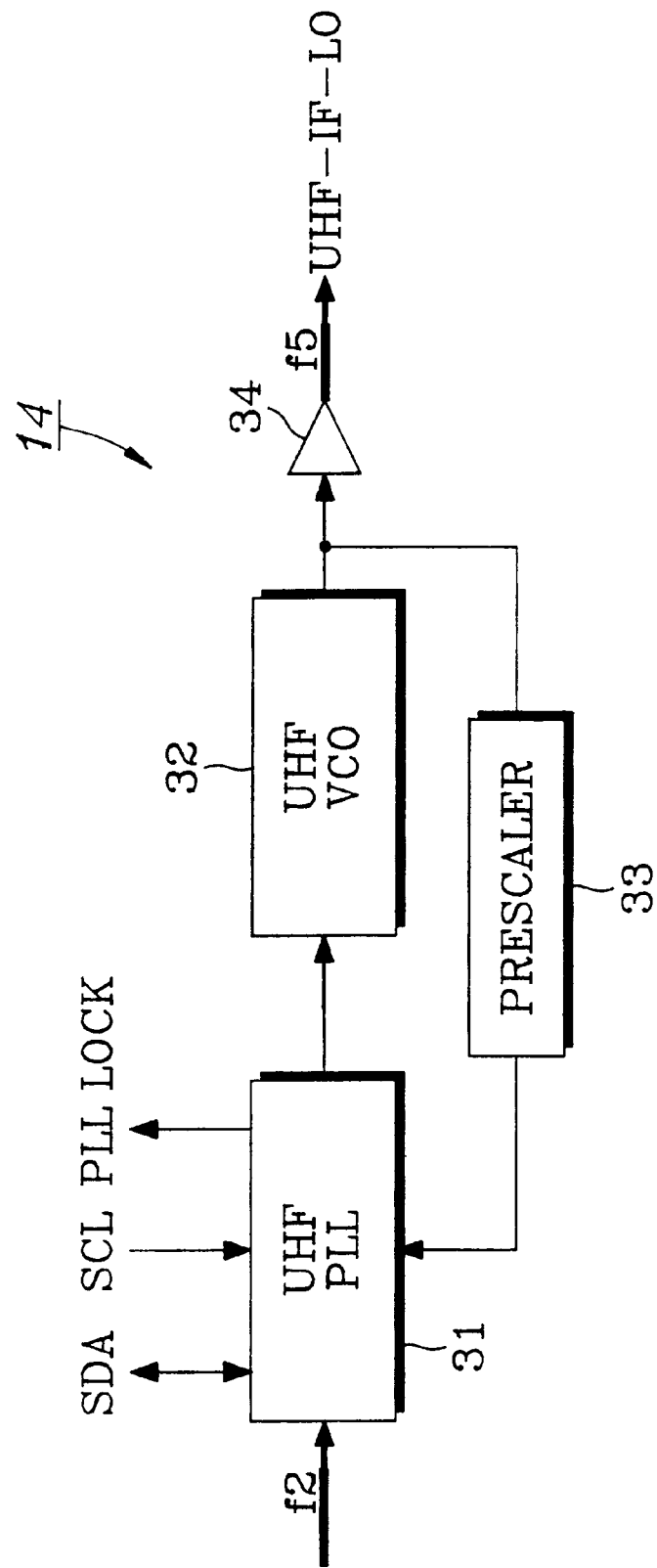
FIG. 3 is a block diagram of a third radio frequency generator in FIG. 1.

FIG. 3 is a block diagram of the third radio frequency generator 14 shown in FIG. 1. Referring to FIG. 3, UHF-PLL 31 receives control data SDA and clock SCL, output from the transceiver slave board 25, the signal f2 and an output from prescaler 33. The UHF-PLL 31 is in a free-running operation mode during the initial state, where it outputs phase loop lock data PLL-LOCK to transceiver slave board 15 when its operation stabilizes. When the UHF-PLL 31 reaches a normal operation state, it generates an oscillation control signal according to the phase difference between the signal f2 and the signal output from the prescaler 33. As the UHF-PLL, commercially available Part Number TBB200G from Siemens Ag. may be used.

A UHF-VCO 32 oscillates according to the oscillation control signal from the UHF-PLL 31, and generates a 754 to 779 MHz signal, f5. The prescaler 33 prescales signal f5, from the UHF-VCO 32, for the UHF-PLL 31. As the prescaler, commercially available Part Number MC2022AD from the Motorola Co. can be used. An amplifier 34 amplifies the signal f5 from the UHF-VCO 32, and outputs it as a UHF local oscillator frequency signal UHF-IF-LO.

The radio frequency generators 11 to 14 can be constructed to operate in a PLL mode to generate predetermined local oscillator frequencies. Preferably, the reference frequency generator 11 and the first radio frequency generator 12 operate in a single-modulus mode, and the second radio frequency generator 13 and the third radio frequency generator 14 operate in a dual-modulus mode. In the above-described radio frequency generator of the present invention, there is a 45 MHz frequency difference between signal f3, local oscillator frequency RX-IF-LO, used in the reception circuit and signal f4, local oscillator frequency TX-IF-LO, used in the transmission circuit, where signals f3 and f4 are supplied to synthesizers of the reception and transmission circuits, respectively. Signal f5, UHF local oscillator frequency UHF-IF-LO, is supplied to the synthesizers of the transmission and reception circuits. Therefore, the transmission and reception bands are determined by the frequency difference between signals f3 and f4, signal f5 is used to up-convert the frequency of the transmission data signal in the transmission circuit or to down-convert the frequency of the reception data signal in the reception circuit.

Figure 4:
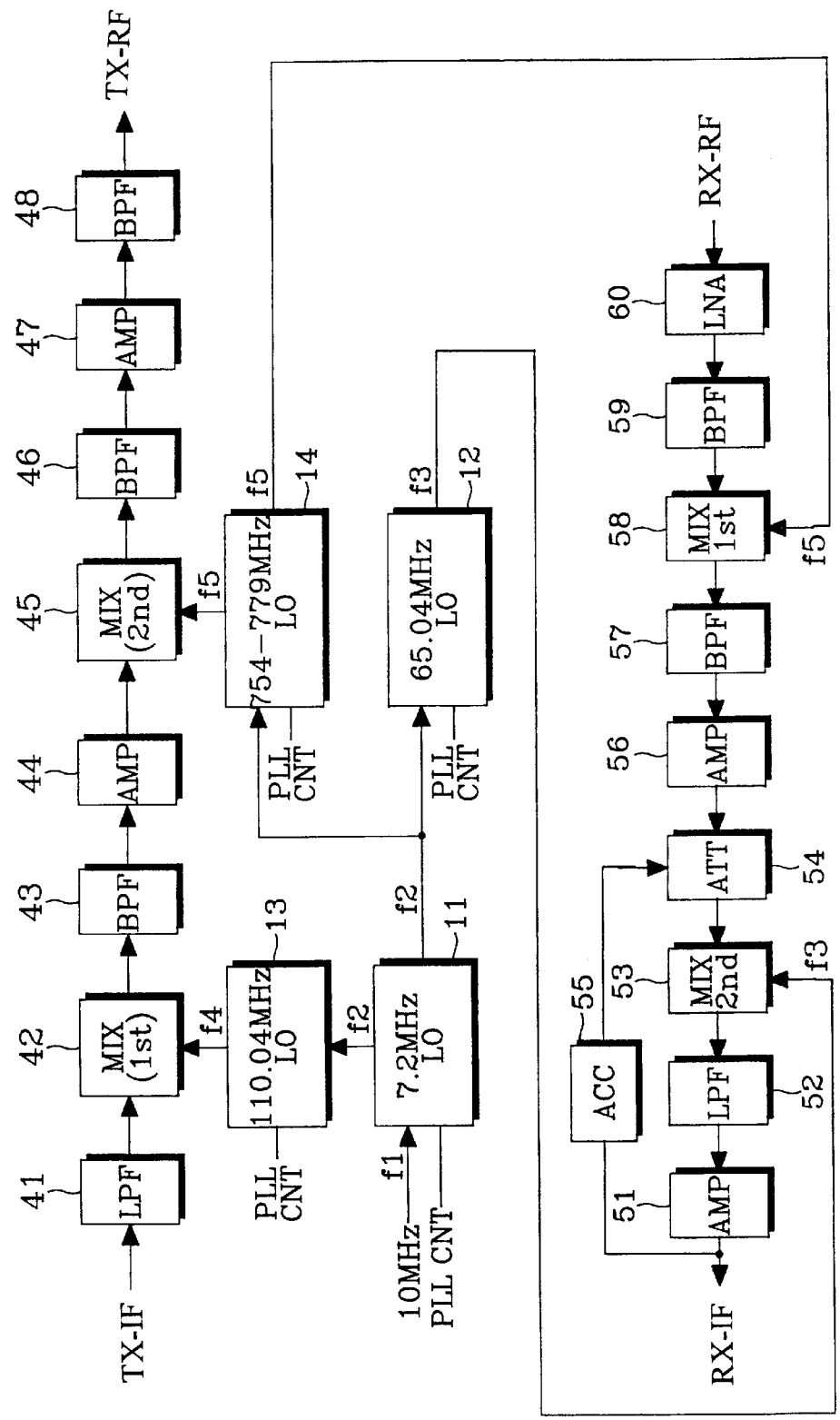
FIG. 4 is a block diagram showing transmission and reception of data in the digital cellular base station according to an embodiment of the present invention.

FIG. 4 is a block diagram showing the transmission and reception processes in a digital cellular base station where, the frequency of the transmitted data signal is up-converted and the radio frequency of received data is down-converted, using the frequency generator according to the present invention. Referring to FIG. 4, the transmission process up-converts and transmits the data transmission signal. A lowpass filter 41 filters the lower 4.95 MHz of transmission data TX-IF. A first mixer 42 receives the transmitted data TX-IF, 110.04 MHz signal f4, the transmission local oscillator frequency output from the second radio frequency generator 13, and mixes signals TX-IF and f4, to thereby generate a sum signal and a difference signal.

A band pass filter, 43, receiving the output from the first mixer 42, filters a band of 114.99 MHz of the sum signal in the mixed signal. That is, bandpass filter 43 band-pass-filters the band of the sum signal from the output of first mixer 42, to thereby selectively output an intermediate frequency for the purpose of up-converting of the frequency of the transmitted data. An amplifier 44 amplifies the intermediate frequency output from bandpass filter 43. A second mixer 45 receives the output from amplifier 44 and signal f5 from the third radio frequency generator 14, and mixes the two signals, to thereby generate a sum signal and a difference signal.

A bandpass filter 46, receiving the output from second mixer 45, filters a band of 869 to 894 MHz from the sum signal. That is, band pass filter 46 filters the sum signal from the output of second mixer 45, and up-converts the frequency of the transmission data to the UHF band. An amplifier 47 amplifies signals in the UHF band which are output from band passfilter 46. A bandpass filter 48, receiving the output of amplifier 47, filters a frequency of 869 to 894 MHz of the transmission band in the digital cellular base station and outputs transmission radio signal TX-RF.

In the reception process, the frequency of reception radio signal RX-RF is down-converted. A low noise amplifier, LNA 60, amplifies a weak radio signal RX-RF received through an antenna. A bandpass filter 59, receiving the output of LNA 60, filters a frequency of 824 to 849 MHz. A first mixer 58 receives the output from bandpass filter 59 and signal f5 from the third radio frequency generator 14, and mixes the two signals to generate a sum signal and difference signal. A bandpass filter 57, receiving the output of first mixer 58, filters out the difference signal bandpass filter 57 selectively outputs a frequency in the band of the difference signal in order to down-convert the frequency of the reception data having a UHF band output from the first mixer 58.

An amplifier 56 amplifies the frequency output from bandpass filter 57. A second mixer 53 receives the output from amplifier 56 and signal f3 from the first radio frequency generator 12, and mixes these two signals to thereby generate a sum signal and a difference signal. A lowpass filter 52, receiving the output from second mixer 53, filters the low-band signal from the difference signal. Lowpass filter 52 selectively outputs a frequency in the band of the difference signal in order to down-convert the frequency of the received data in the mixed signal. An amplifier 51 amplifies the output from lowpass filter 52. The intermediate frequency output from amplifier 51, becomes reception data RX-IF. An auto gain control circuit, (AGC) 55, analyzes the reception data RX-IF, to thereby generate a control signal automatically controlling the gain of the received signal. An attenuator 54, connecting between amplifier 56, and second mixer 53, attenuates the gain of the intermediate frequency output from amplifier 56, and transmits it to second mixer 53.

As described above, the frequency generator of the present invention consists of reference frequency generator 11 generating a 7.2 MHz frequency signal, first radio frequency generator 12, generating a 65.04 MHz signal, second radio frequency generator 13, generating 110.04 MHz and third radio frequency generator 14, generating a frequency in the UHF band of 754 to 779 MHz.

Accordingly, the radio frequency generator of the present invention includes the radio frequency generator, which generates transmission local frequency TX-IF-LO, and the radio frequency generator, which generates reception local frequency RX-IF-LO, to thereby provide the signals at the appropriate frequencies to the transmission and reception circuits independently of each other. Furthermore, the radio frequency generator of the present invention provides an output from the frequency generator generating local frequency UHF-IF-LO in the UHF band to the transmission and reception circuits.

Accordingly, when the radio frequency generator of the present invention is employed in the transceiver of the digital cellular base station, transmission and reception local radio frequency generators having a 45 MHZ frequency difference are used separately, and the output of the local radio frequency generator in the UHF band is used in the transmission and reception circuits. By doing so, the spurious effect due to interference between local oscillator frequencies in the UHF band can be removed.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A radio frequency generator for a radio communication system having a transmitter for up-converting the frequency of transmission data signals, and a receiver for down-converting the frequency of reception data signals, comprising:

a reference frequency generator for receiving a radio frequency signal from a global positioning system receiver, and for generating a reference signal for the purpose of generating local oscillator frequency signals;

a first radio frequency generator for receiving the reference frequency signal, and for generating a low-band reception local oscillator frequency signal in response thereto which is output to a second mixer of the receiver;

a second radio frequency generator for receiving the reference frequency signal, and for generating a low-band reception local oscillator frequency signal in response thereto which is output to a first mixer of the transmitter;

a third radio frequency generator for receiving the reference frequency, and for generating a high-band local oscillator frequency signal in response thereto which is output to a first mixer of the receiver and a second mixer of the transmitter;

the transmitted data signals being mixed with the transmission local oscillator frequency signal and the high-band local oscillator frequency signal when the frequency of the transmitted data signals is up-converted, and the reception data signals being mixed with the high-band local oscillator frequency signal and the reception local oscillator frequency signal when the frequency of the reception data signals is down-converted.

2. The frequency generator as claim in claim 1, the low-band reception local oscillator frequency being 65.04 MHz, the low-band transmission local oscillator frequency being 110.04 MHz, and the high-band local oscillator frequency being 754 to 779 MHz.

3. The frequency generator as claim in claim 1, each of the radio frequency generators generating the local oscillator frequencies comprising a phase lock loop circuit.

4. A method of transmitting and receiving data signals in a radio communications system having radio frequency generators for generating a reception local oscillator frequency signal, a transmission local oscillator frequency signal and a UHF-band local oscillator frequency signal, comprising the steps of:

receiving a radio frequency signal from a global positioning system receiver and generating a reference signal which is fed to said radio frequency generators for generating the reception local oscillator frequency signal, the transmission local oscillator frequency signal and the UHF-band local oscillator frequency signal in response thereto;

mixing the transmission data signal with the transmission local oscillator frequency signal so as to first-up-convert the transmission data signal, mixing the first-up-converted transmission data signal with the UHF-band local oscillator frequency signal so as to second-up-convert the first-up-converted transmission data signal, and then transmitting the up-converted transmission data signal; and mixing the reception data signal with the UHF-band local oscillator frequency signal so as to first-down-convert the reception data signal, mixing the first-down-converted reception data signal with the reception local oscillator frequency signal so as to second-down-convert the first-down-converted reception data signal, and then transmitting the up-converted transmission data signal; and then generating the reception data signal.

5. The method as claimed in claim 4, the reception local oscillator frequency being 65.04 MHz, the transmission local oscillator frequency being 110.04 MHz, and the UHF-band local oscillator frequency being 754 to 779 MHz.

* * * * *